United States Patent [19]
Ono et al.

[11] Patent Number: 5,668,966
[45] Date of Patent: Sep. 16, 1997

[54] SYSTEM AND METHOD FOR DIRECT MANIPULATION OF SEARCH PREDICATES USING A GRAPHICAL USER INTERFACE

[75] Inventors: Kiyoshi Ono, Yokohama; Yoichi Yoshida, Zama, both of Japan

[73] Assignee: International Business Machines Corporation, Armonk, N.Y.

[21] Appl. No.: 381,260

[22] Filed: Jan. 31, 1995

[30] Foreign Application Priority Data

Feb. 15, 1994 [JP] Japan ................................. 6-018639

[51] Int. Cl.$^6$ .................................................. G06F 3/00
[52] U.S. Cl. ......................................... 345/356; 345/968
[58] Field of Search ................................ 395/155–161, 395/356

[56] References Cited

U.S. PATENT DOCUMENTS

| | | | |
|---|---|---|---|
| 5,404,506 | 4/1995 | Fujisawa et al. | 395/600 |
| 5,428,737 | 6/1995 | Li et al. | 395/161 |
| 5,495,605 | 2/1996 | Cadot | 395/600 |
| 5,499,368 | 3/1996 | Tate et al. | 395/600 |
| 5,515,488 | 5/1996 | Hoppe et al. | 395/161 X |

*Primary Examiner*—Raymond J. Bayerl
*Assistant Examiner*—A. Katbab
*Attorney, Agent, or Firm*—Mark S. Walker

[57] ABSTRACT

A graphical user interface is provided which can create a predicate for searching for data using only mouse operations on the desktop, and apply the predicate to a database system containing objects to be searched. The user can identify a primitive predicate by inputting search items (that is, file attributes) on the desktop, and can create a logical operation expression for identifying search conditions by displaying a composite predicate representing a logical operator as a folder, and by dragging and dropping an icon representing the predicate on that folder. The logical operation expression can be hierarchically organized and stored. Moreover, a predicate can be displayed on the desktop on a desired hierarchical level by opening or closing an icon for each composite predicate from an icon to a folder, or a folder to an icon. A predicate can be applied as search conditions by dropping an icon representing the created predicate on a folder representing a database (in this case, the dropped object of display becomes the search range). Further, the predicate can be applied to the database by dropping an icon representing the database on a predicate icon (or, folder).

9 Claims, 13 Drawing Sheets

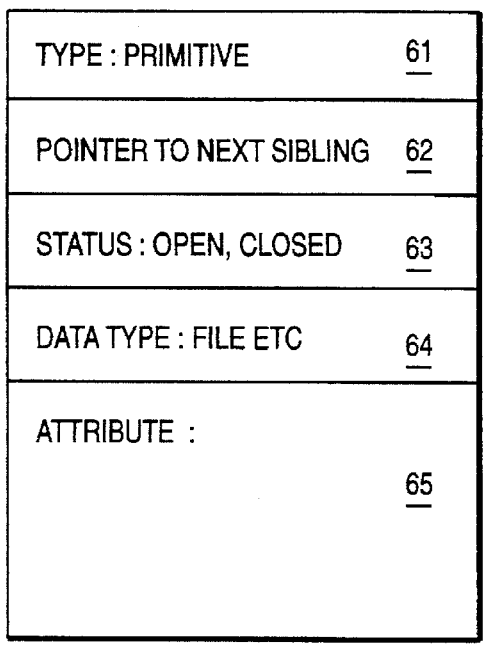
FIG. 3A
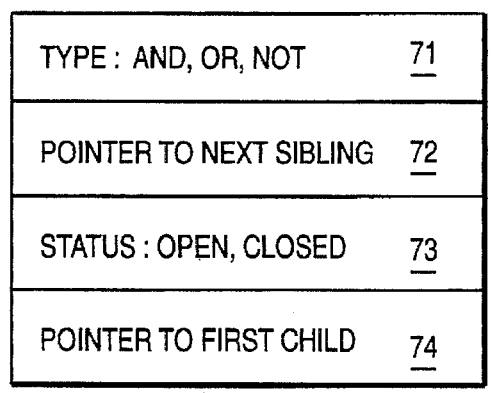
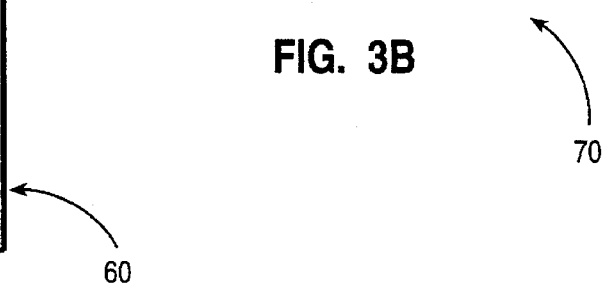
FIG. 3B
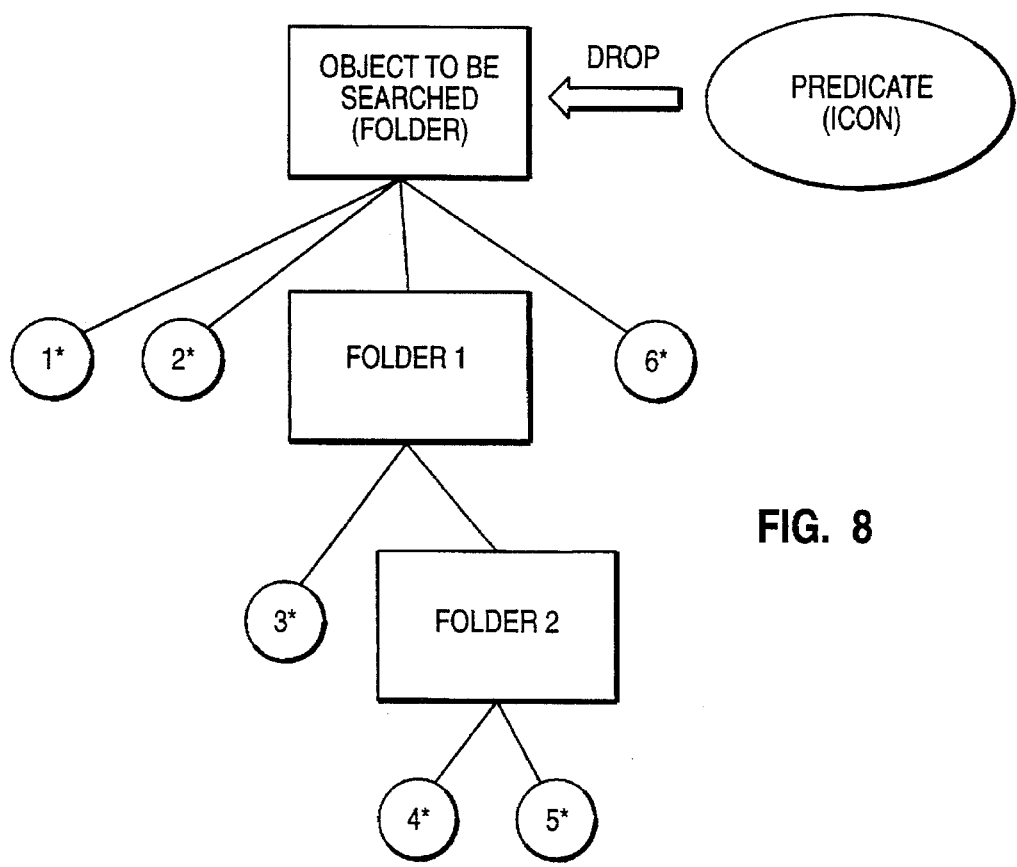
FIG. 8

(P1 OR P2) AND (P3 OR P4)
FIG. 4A
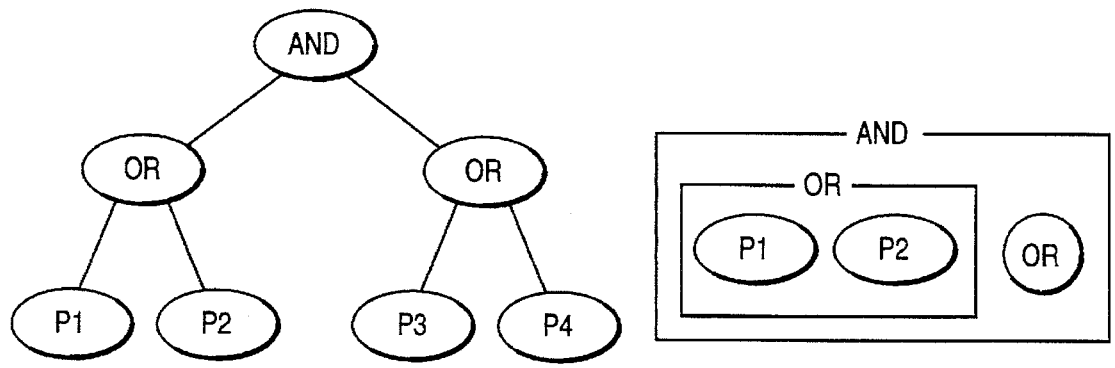
FIG. 4B
FIG. 4C
FIG. 4D
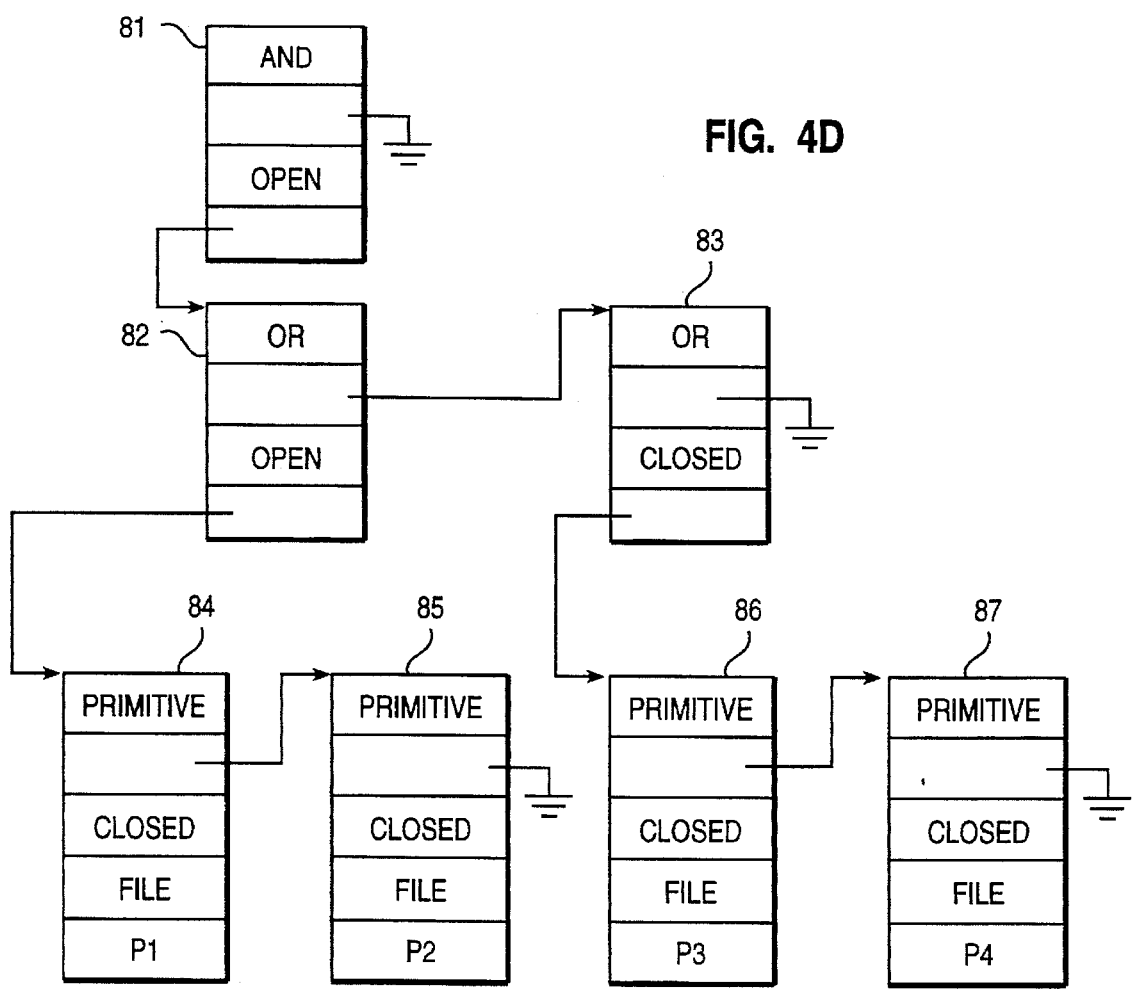

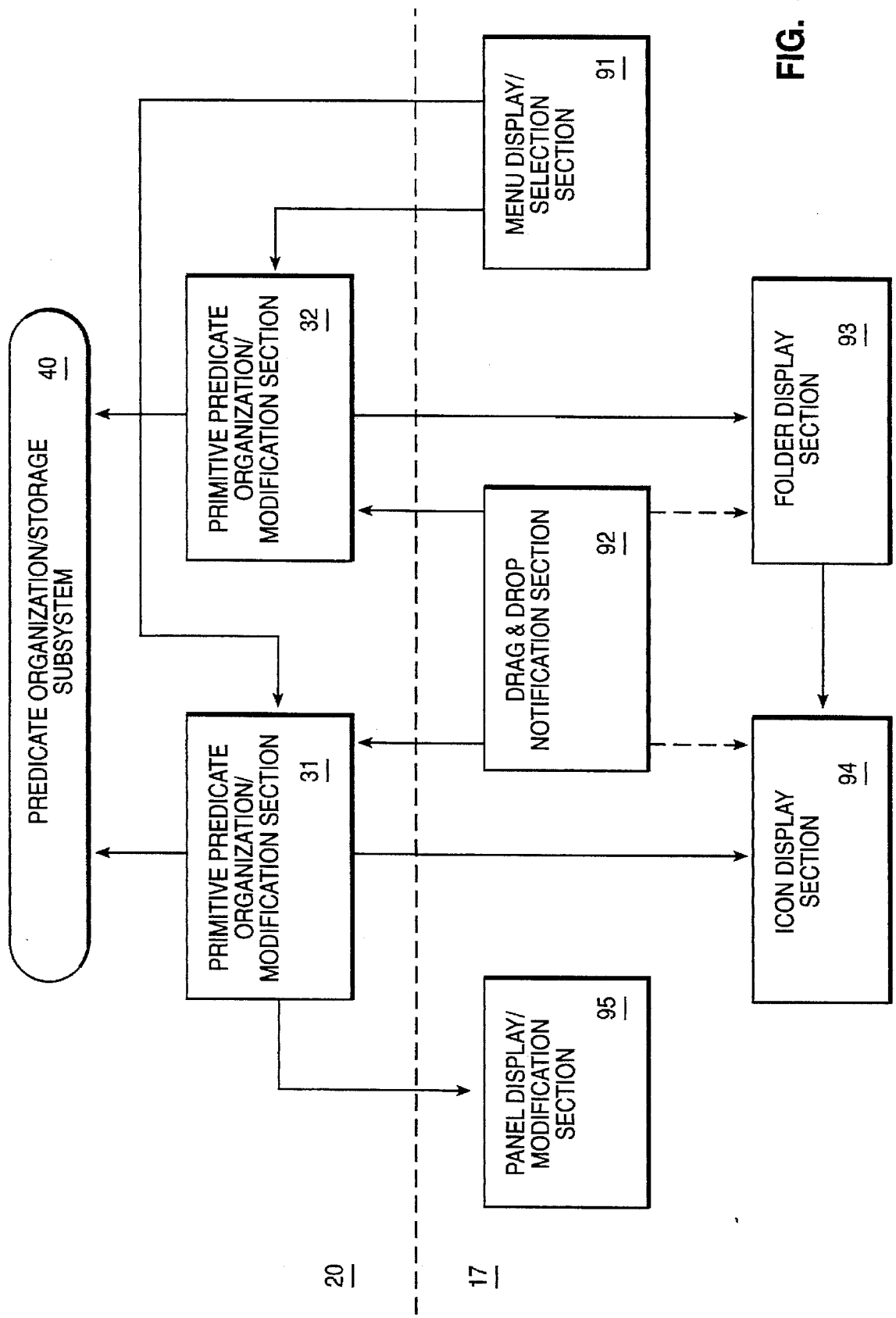

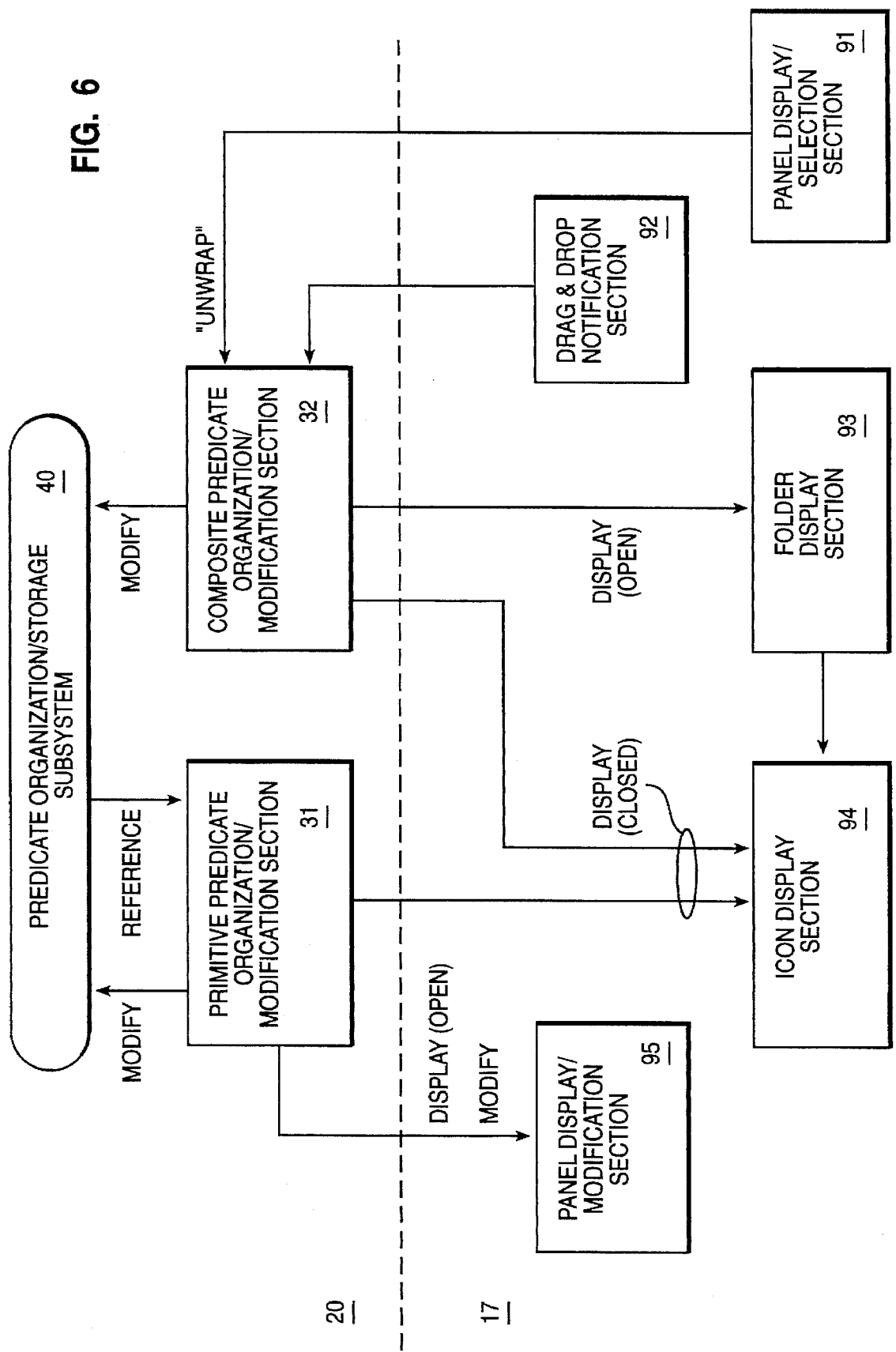

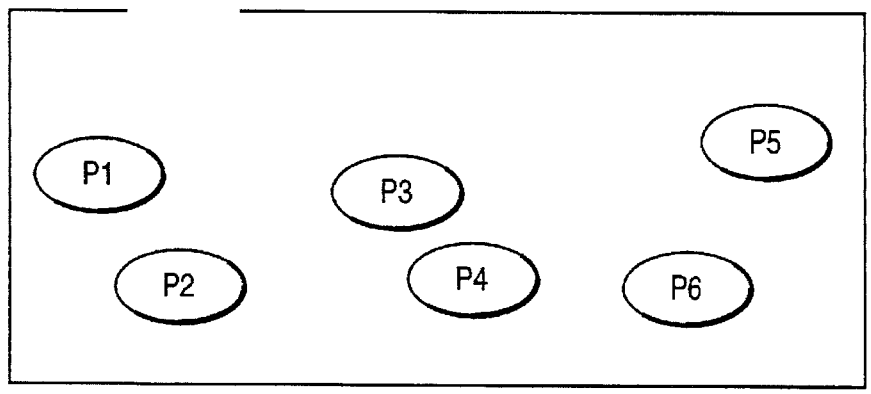
SELECT P3 AND P4
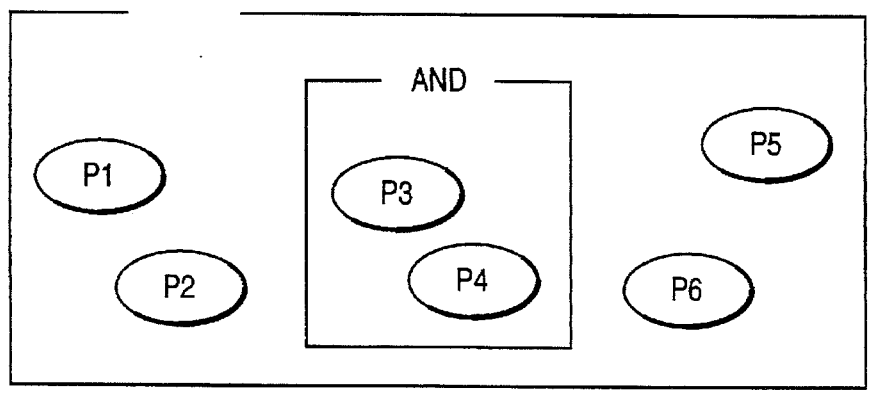
SURROUND P3 AND P4 WITH AND FOLDER
FIG. 14

SYSTEM AND METHOD FOR DIRECT MANIPULATION OF SEARCH PREDICATES USING A GRAPHICAL USER INTERFACE

BACKGROUND OF THE INVENTION

1. Field of the Invention

This invention relates to a graphical user interface for supporting interactive input by a user on a computer system and, more particularly, to a graphical user interface which enables the user to input an intent by operating an icon through a mouse. More specifically, it relates to a graphical user interface enabling the user to set, by only operating a mouse, a predicate which retrieves only desired objects from a database, which stores and manages a number of objects, and filters and reads them. Here, "objects" to be retrieved shall include various files such as text files and name files, and image and other multimedia data.

2. Background and Related Art

Currently, a personal computer or workstation generally has a bit-map display and an operating system (such as OS/2 or Windows). Along with this, a known conventional technique for a personal computer or workstation provides a user with a graphical user interface environment which comprises a simulated desktop window and icons.

Here, "desktop" means a screen on which the user performs activities, and a background on which objects such as icons and windows are placed.

Further, "icon" means a small picture representing a usable object, and is arranged to be placed on the desktop or on a window within the desktop. The icon can represent an application, a disk drive, a directory, a group, or a document.

In addition, a "window" means a frame displayed on the desktop for displaying some objects. The window is generally standardized, and arranged to be able to provide common frames relating to various information processed by the user. Standard components of a window are a window title bar and a window boundary. The title bar means an area for displaying the title of an applicable window, with this title allowing identification of information (object) currently displayed in the window.

In addition, the user is usually provided with a coordinate selection device such as a mouse or track ball for selecting coordinate values and an input device such as a keyboard. Then, the user can move windows around on the desktop, set their size, and manipulate them by dragging (an operation in which the mouse is moved while a mouse button is being pressed). Moreover, the user can view the contents of an object through a window by opening an icon by clicking with the mouse (an operation in which a mouse button is pressed and released), or can minimize an object being operated on to an icon.

Further, it is well known in the art to hierarchically organize and store a plurality of created files by utilizing the directory or folder concept. Furthermore, at present, the hierarchical organization and storage of a plurality of documents can be implemented through manipulation of an icon with the mouse by combining the document organization technique and the above-mentioned window displaying technique, which would be apparent to those skilled in the art.

An example of the hierarchical organization of documents is described as follows:

For example, as shown in FIG. 15, it is assumed that a plurality of files (that is, file 1, file 2, and file 3) are hierarchically organized in a file system incorporated (or provided) in a computer system. As shown in FIG. 15, files 1 and 2 are stored in a further subdivided directory 1, and the file 3 is stored in a further subdivided directory 2. FIG. 16 is an example displaying hierarchical files on the desktop. In FIG. 16, each file (file 1, file 2 file 3) is displayed in the form of an icon as F1, F2 and F3. Here, folders 1 and 2 in FIG. 16 correspond to directories 1 and 2 in FIG. 15. It is possible to clearly indicate by surrounding icons F1 and F2 by an area framed by the folder 1 that files 1 and 2 are contained in the directory 1. Similarly, it is possible to clearly indicate by surrounding the icon F3 by an area framed by the folder 2 that the file 3 is contained in the directory 2.

In addition, each folder can be identified by a title provided for the folder, and can be visually recognized by changing the color of the area in the folder from that of the background. Furthermore, a folder displayed on the desktop can be minimized to an icon by a predetermined mouse operation (for example, clicking on a minimize-to-icon menu in a template (or a minimize-to-icon button on the title bar, not shown)), or a minimized-to-icon folder can be opened by a predetermined mouse operation (for example, double-clicking of a mouse button on an appropriate icon (quickly pressing the mouse button twice without moving the mouse)). Moreover, a minimized-to-icon file can be similarly opened by the mouse operation, or the opened file can be minimize to an icon.

As shown in FIG. 17, the user can move a minimized-to-icon file from one directory to another by dragging and dropping (releasing a continuously pressed mouse button) in a directory where the icon is placed (FIGS. 17(a) and (b)). In addition, a minimized-to-icon file can be deleted from the file system by drag & drop on the shredder icon (not shown), just as an actual shredder shreds a form.

As described above, the user can copy, move to another folder, and delete a predetermined file on the desktop via only mouse operation. In other words the user can hierarchically organize a plurality of files by basic mouse operations such as drag & drop (this is already knows by itself). Then, in each activity, the user need not understand a complicated program, but need only be aware of the presentation on the desktop.

Operations requested by the user for the organized and stored file system include search for or retrieval of a file in addition to the above. A file search is done by the user to identify a specific predicate and apply it to the file system (a predicate means a file search condition such as "a file with a file size larger than 10,000 bytes"). A conventional approach for identifying a predicate is usually to display a panel on the desktop, and for the user to input desired value (or a search item) in an attribute field of the panel. Then, the panel to be applied to the file search usually includes one or more attribute fields in which various file attributes such as file name, file type, file creation time, and most recent update time are input.

In addition, predicates identified by the user are of two types: primitive or atomic and composite. The primitive predicate is a minimum unit which contains at least one search item and cannot be divided. Details identified by search items in attribute fields on the panel related to the predicate become search conditions. The composite predicate combines a plurality of primitive predicates and other composite predicates with logical operators such as AND, OR, and NOT. The results of logical operations of search items in attribute fields in each primitive predicate become search conditions for files. It is possible to consider all entire predicates as having a hierarchical structure by representing each primitive predicate and composite predicate as one node, and representing other predicates, which are terms of logical operation related to some composite predicate, as a node immediately below the composite predicate.

It is relatively easy for the user to identify a primitive predicate because it is sufficient for the user to fill in attribute fields on the panel displayed on the desktop with the search items. However, it is not easy to identify a composite predicate because a plurality of keywords can be specified by a common search tool, but specification of AND or OR between keywords is performed only in a limited manner.

For example, the DOS Office of Office Vision/400 provides a document search tool as shown in FIG. 18. This search tool enables up to three keywords to be specified and is designed to search for AND condition for each specified keyword (that is, to search documents containing all specified keywords). With such a search tool, it is impossible to make a complicated specification such as "documents in either English or Japanese for the last single month, and those in Japanese only earlier than that." If it is desired to make such a search, it can only be done by repeating the similar search several times.

An approach also exists to represent a composite predicate in the form of an algebraic expression such as (A+B)×C, in which attributes A, B, and C are joined by logical operators such as + and ×. However, if the logical expression has many nested layers because many attributes are to be combined, such algebraic expression becomes complicated and difficult to understand to the user, and therefore it cannot be said to be easily understood by the user.

SUMMARY OF THE INVENTION

Problems to be solved by the invention

A purpose of the present invention is to provide an excellent user graphical user interface allowing the user to easily identify a complicated predicate.

Another purpose of the present invention is to provide an excellent graphical user interface which allows it with only a mouse operation on the desktop to create a predicate for searching for data, and to apply that predicate to a database system containing objects to be searched for.

Means for solving the problems

The present invention is made by taking the above problems into consideration, and can operate on a computer system provided with a coordinate selection device such as a mouse for graphic pointers on a desktop, an enter key such as a mouse button, and support for displaying a plurality of windows.

The present invention is a graphical user interface being operated on a computer system, which includes a CPU, a keyboard for console input, a mouse for selecting coordinate values, storage for storing and managing one or more objects, and is loaded with an operating system for controlling the operation of the CPU and a Window Manager supporting display of objects on the console, wherein the graphical user interface comprises:

(a) a predicate creation section for creating predicates for searching for desired objects in storage;
(b) a predicate organization/storage section for hierarchically organizing and storing created predicates; and
(c) a predicate application section for applying stored predicates to one or more objects in storage.

The predicate creation section includes:

(a) a primitive predicate creation section for creating an indivisible primitive predicate containing search items; and
(b) a composite predicate creation section for creating a composite predicate which consists of a logical operation for one or more predicates.

The predicate organization/storage section is to organize and store one or more predicates in a form combining them with each other by one or more logical operations, and arranged to prepare a data block corresponding to each predicate created by the primitive creation section and the composite creation section. In addition, the predicate organization/storage section is to organize and store one or more predicates in a form combining them by one or more logical operations, and is arranged to hierarchically organize and store predicates in such a manner that a second predicate (provided the second predicate is a composite predicate) for forming logical operations between first predicates (provided the first predicate is a primitive predicate or a composite predicate obtained in previous logical operation on other predicates) is placed at a level immediately above the first predicates.

The predicate application section includes:

(a) a primitive predicate application section for applying a primitive predicate to the object in the storage; and
(b) a composite predicate application section for applying a composite predicate to objects in storage.

The primitive predicate creation section, the composite creation section, the primitive predicate application section, and the composite predicate application section are characterized in that they can operate in response to drag & drop notification via the mouse from the Window Manager.

The predicate creation section sends to the Window Manager commands for displaying a composite predicate on the desktop as a folder, or presenting a primitive predicate and a composite predicate as the respective icons.

Effects

As described in the Prior Art, the user can build a database in which a plurality of files is hierarchically organized by only mouse operation which drags and drops an icon corresponding to a file (object) inside or outside a folder corresponding to a directory, which is well known by itself.

In addition, according to the present invention, the user can identify a primitive predicate by inputting search items (that is, file attributes) on the desktop, and create a logical operation expression for identifying search conditions by presenting, as a folder, a composite predicate representing a logical operator, and dragging and dropping an icon representing a predicate in the folder. Then, the logical operation expression can be hierarchically organized and stored.

The entire predicate for identifying search conditions frequently generates deeper nesting in which predicates are combined by other logical operators. In this case, it becomes complicated and difficult to understand if it is expressed as an ordinary algebraic expression. However, the present invention provides excellent operability because a predicate can be displayed on the desktop at the desired hierarchal level.

Then, the created predicate can be applied as a search condition by dropping an icon representing the predicate on a folder (or icon) representing a database, provided that the folder object on which it is dropped is the search range. Furthermore, a predicate can be applied to a database by dropping an icon representing the database on a predicate icon (or folder).

Thus, the user can create a predicate by icon manipulation on the desktop without having to understand details of a complex program, and applies it to a file system which is hierarchically organized and stored.

Further objects, features, and advantages of the present invention will be made clear from the following detailed description based on an embodiment and the attached drawings.

BRIEF DESCRIPTION OF THE DRAWINGS

FIG. 3 is a diagram showing a data structure used for an embodiment of the present invention, wherein FIG. 3 (a) is a diagram showing the configuration of a data block of a primitive predicate, and FIG. 3 (b) is a diagram showing the configuration of a data block of a composite predicate;

FIG. 4 is a diagram showing an edited final predicate, wherein FIG. 4 (a) represents the predicate in the ordinary form of logical expression, FIG. 4 (b) represents the predicate shown in FIG. 4 (a) in a tree structure, FIG. 4 (c) represents an example of the predicate shown in FIG. 4 (a) displayed on the desktop, and FIG. 4 (d) represents the predicate shown in FIG. 4 (a) in the form of data block;

FIG. 5 is a conceptual diagram showing the cooperative operation between the Predicate Manipulation System and the Window Manager in creating a predicate FIG. 6 is a conceptual diagram showing the cooperative operation between the Predicate Manipulation System and the Window Manager in further modifying or correcting the created predicate;

FIG. 8 is a conceptual diagram showing what happens when a predicate icon is dropped on an object to be searched;

FIG. 14 is a diagram showing basic mouse operations which the user may use on the desktop, and specifically a diagram showing creation of a composite predicate;

DETAILED DESCRIPTION OF THE PREFERRED EMBODIMENT

Figure 1:
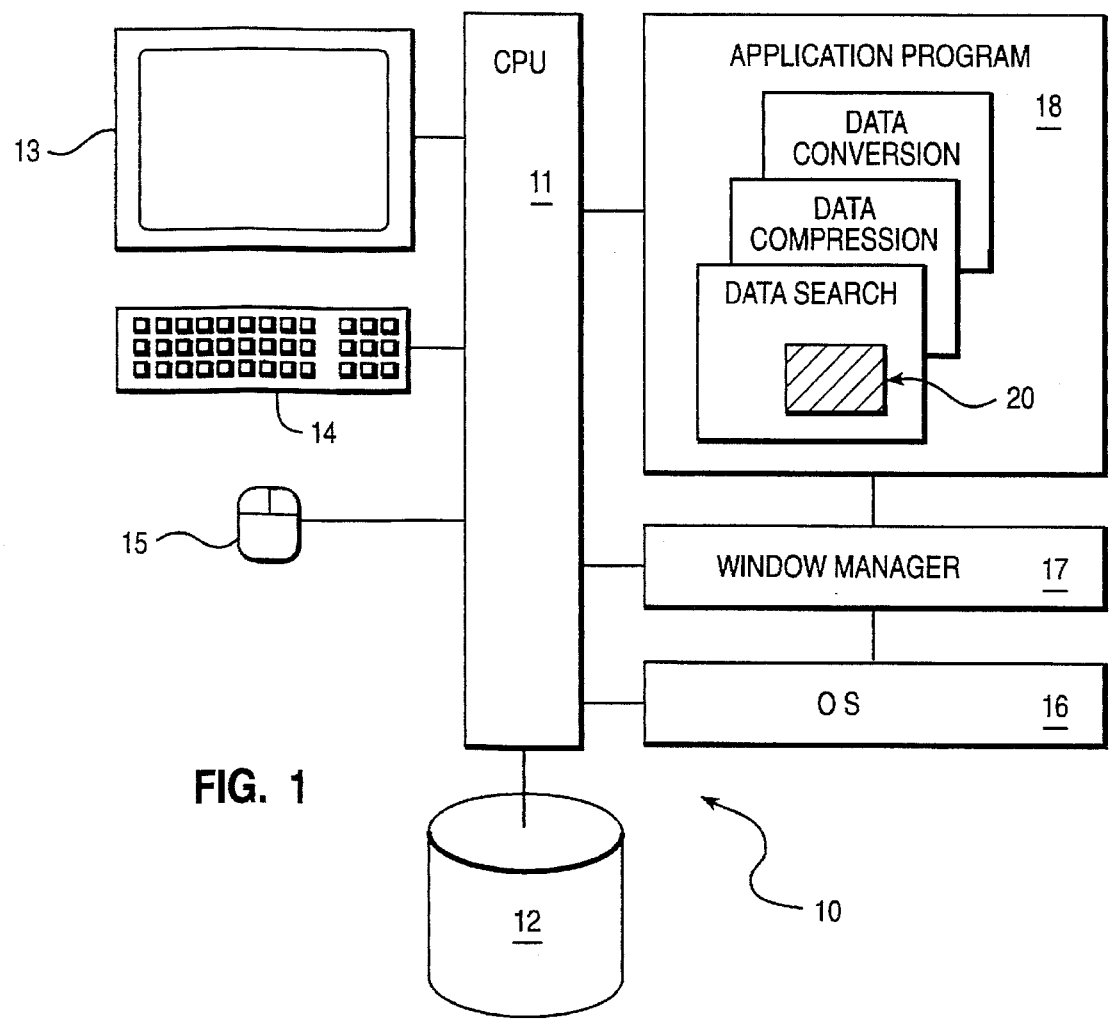
FIG. 1 is a schematic diagram of the configuration of a computer system used for implementing the present invention.

An embodiment of the present invention will be described according to the following items:

A. System Configuration
B. Window Manager
C. Basic Desktop Mouse Operations
C-1. Icon movement from one folder to another
C-2. Expression of composite predicate
C-3. Creation of composite predicate (part 1)
C-4. Creation of composite predicate (part 2)
D. Predicate Manipulation System
D-1. Predicate data structure
D-2. Creation of predicate
D-2-1. Creation of primitive predicate
D-2 -2. Creation of composite predicate
(I) Creation of composite predicate by icon drag & drop
(II) Creation of composite predicate by WRAP operation
D-3. Organization and storage of predicate
D-4. Application of predicate
D-4-1. Dropping of predicate icon on object to be searched
D-4-2. Dropping of icon to be searched on predicate icon A. System Configuration FIG. 1 shows the schematic configuration of a computer system (10) to be used for implementing the present invention. That is, the system (10) has such a configuration in which a typical personal computer or workstation comprising a CPU (11), a file system or database system (12), a display (13), a keyboard (14), and a mouse (15) supports an operating system (16), a Window Manager (17), and an application program (18). The CPU (11) is usually configured by a microprocessor, RAM, and ROM. The database system (12) is a section which stores a plurality of objects to be searched such as files consisting of text, name files, and multimedia data such as images, and can be accessed by the application program (18). The operating system (16) is a section in which programs for controlling the operation of the CPU (11) are concentrated and to which OS/2 (OS/2 being a trademark of IBM) or the like corresponds. The Window Manager (17) is a section which supports various service functions, which will be described later, for the application program (18), and to which the Presentation Manger (PM) provided in OS/2 or the like corresponds. The application program (18) is a section where the various application programs executed by the CPU (11) are placed and which includes as one of these the Predicate Manipulation System (20) used for implementing the present invention.

B. Window Manager

Service functions provided by the Window Manager (17) to application programs (especially, to the Predicate Manipulating System) include the following:

(1) Display of menu, and notification of selection by mouse:

This function displays, at a predetermined position on the desktop, a menu which lists commands available for an application program currently supported by the Window Manager (not shown), and which notifies the application program of selection of a command in the list by the user clicking or otherwise selecting by the mouse.

In the case of the Predicate Manipulation System, the menu has various commands such as CREATE PRIMITIVE (creation of a primitive predicate), CLOSED (minimizing an object), CREATE FOLDER (creation of a folder), WRAP (surrounding icons with a folder), and UNWRAP (removing a folder), all of which are not shown.

(2) Creation and displaying of icon and folder:

The menu on the desktop is prepared with items as available commands corresponding to icon creation, folder creation, and the like. Then, this function is to notify the application program of selection of an item by clicking or otherwise selecting by the mouse (the application program creates an icon or folder at the initial state, that is, the blank state in a data block, described later), and to display a corresponding icon or folder on the desktop.

(3) Notification of icon movement to application program accompanying drag & drop It is possible to appropriately move an object (that is, icon or folder) displayed on the desktop to a desired position by drag & drop. Then, with this function, a coordinate location where an icon is dropped is reported to the application program.

(4) Icon insertion and deletion in folder

With the function (3), an icon can be freely moved on the desktop, or dropped into a folder. This function displays an icon inside a folder in response to receipt of a signal by the application program, the signal which represents dropping of an icon in a folder (corresponding to nesting of an object corresponding to the icon in an object corresponding to the folder at the application program side). In addition, as described in the Prior Art, a function is also provided to delete display of an icon if the icon is dropped on the shredder icon.

(5) Notification of selection of icon in folder by mouse to application:

This function notifies the application program of icon selection inside a folder by the user clicking or otherwise selecting by the mouse.

(6) Enumeration of icons in folder:

This function enumerates, as a list, icons nested in a folder, and sequentially sends them out. For example, this is used to pass icons in a folder one after another, described later.

(7) Icon attribute setting, modification, and inquiry:

Each icon displayed on the desktop has unique attributes such as graphics and locations. This function sets, modifies, and inquires about icon attributes.

(8) Display of panel for primitive predicate and modification of panel contents

As described in the Prior Art, a primitive predicate is identified by writing search items in the attribute field on the panel displayed on the desktop. This function displays a panel related to a primitive predicate on the desktop, or modifies its contents in response to the creation or modification of the primitive predicate.

Such functions (1)–(8) of the Window Manager are existing ones. For example, the Presentation Manager (PM) included in OS/2 has these functions.

Figure 7:
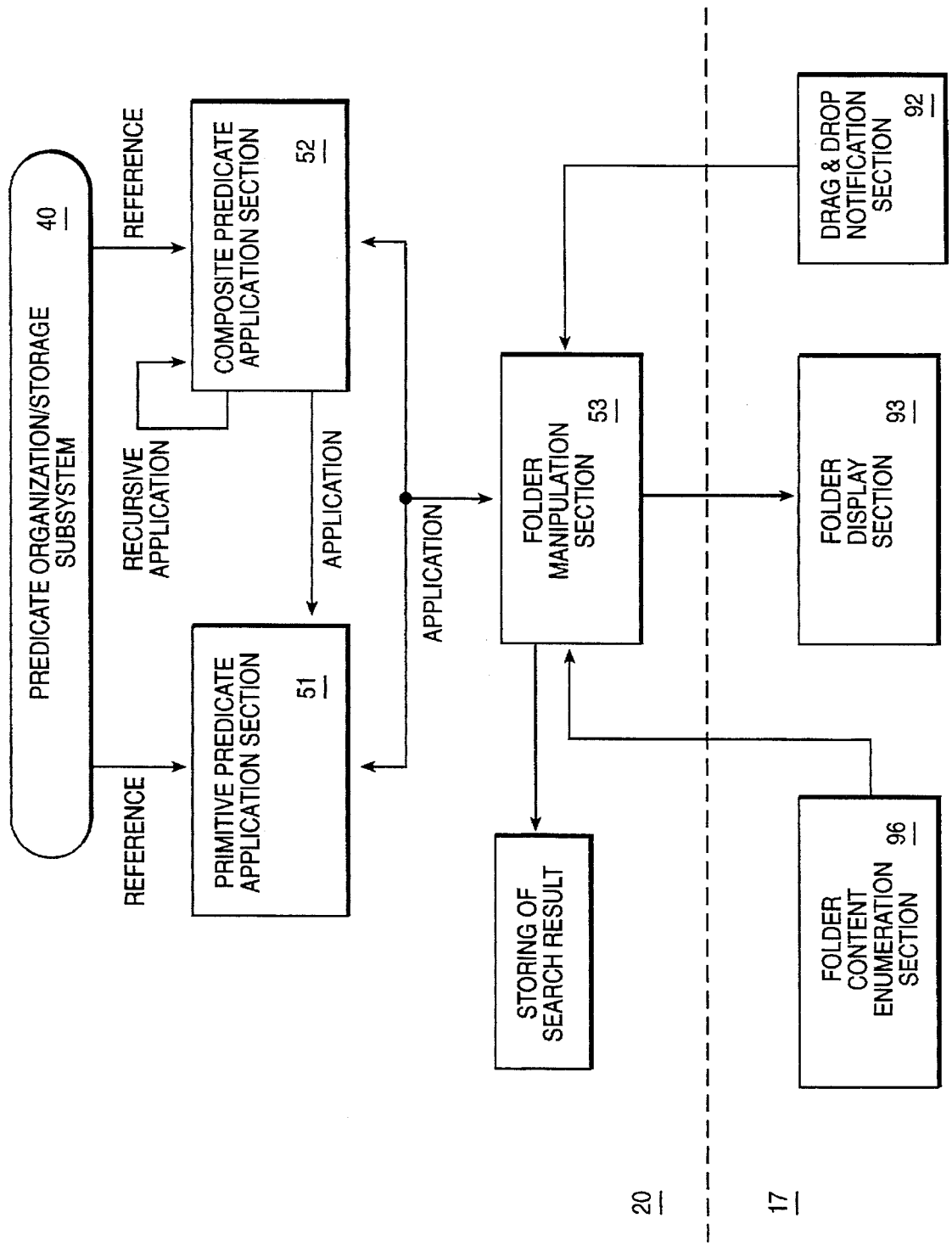
FIG. 7 is a conceptual diagram showing the cooperative operation between the Predicate Manipulation System and the Window Manager in performing a search by the created predicate.

In this embodiment, for convenience sake, the Window Manger (17) is divided, as shown in FIGS. 5 to 7, into a menu display/selection section (91), a drag & drop notification section (92), a folder display section (93), an icon display section (94), a panel display/modification section (95), and a folder content enumeration section (96), which together handle functions (1)–(8).

C. Basic Desktop Mouse Operations

Basic mouse operations which the user may perform on the desktop are described below.

C-1. Icon movement from one folder to another

Figure 11:
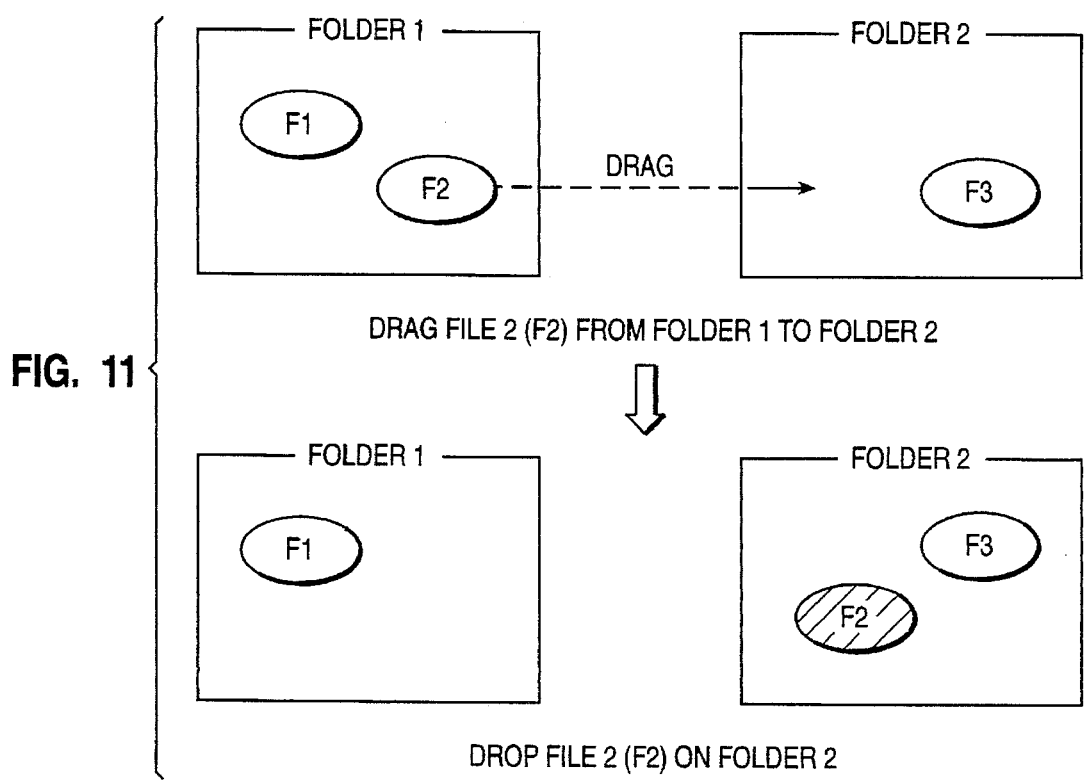
FIG. 11 is a diagram showing basic mouse operations which the user may use on the desktop, and specifically a diagram showing an operation for moving an icon from one folder to another.

As shown in FIG. 11, it is assumed that Folder 1 contains icon 1 (F1) and icon 2 (F2), and Folder 2 contains icon 3 (F3). If it is desired to move an object relating to icon 2 (F2) from Folder 1 to Folder 2, the user need only drag icon 2 (F2) and to drop it on Folder 2. The display on the desktop changes accordingly.

C-2. Expression of composite predicate

Figure 12:
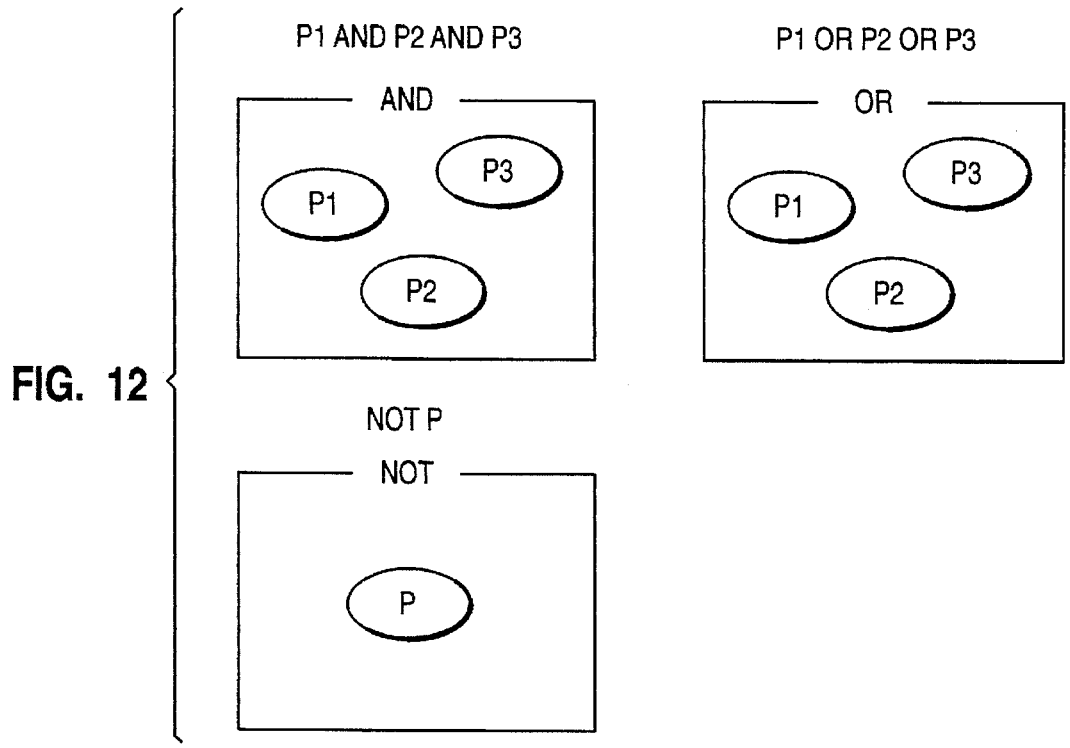
FIG. 12 is a diagram showing basic mouse operations which the user may use on the desktop, and specifically a diagram showing how a composite predicate is displayed

FIG. 12 shows how a composite predicate is displayed on the desktop. For example, $P_1$–$P_2$–$P_3$ is created by entering objects $P_1$, $P_2$, and $P_3$ in an AND folder (the same being true for other OR and NOT folders).

C-3. Creation of composite predicate (part 1)

Figure 13:
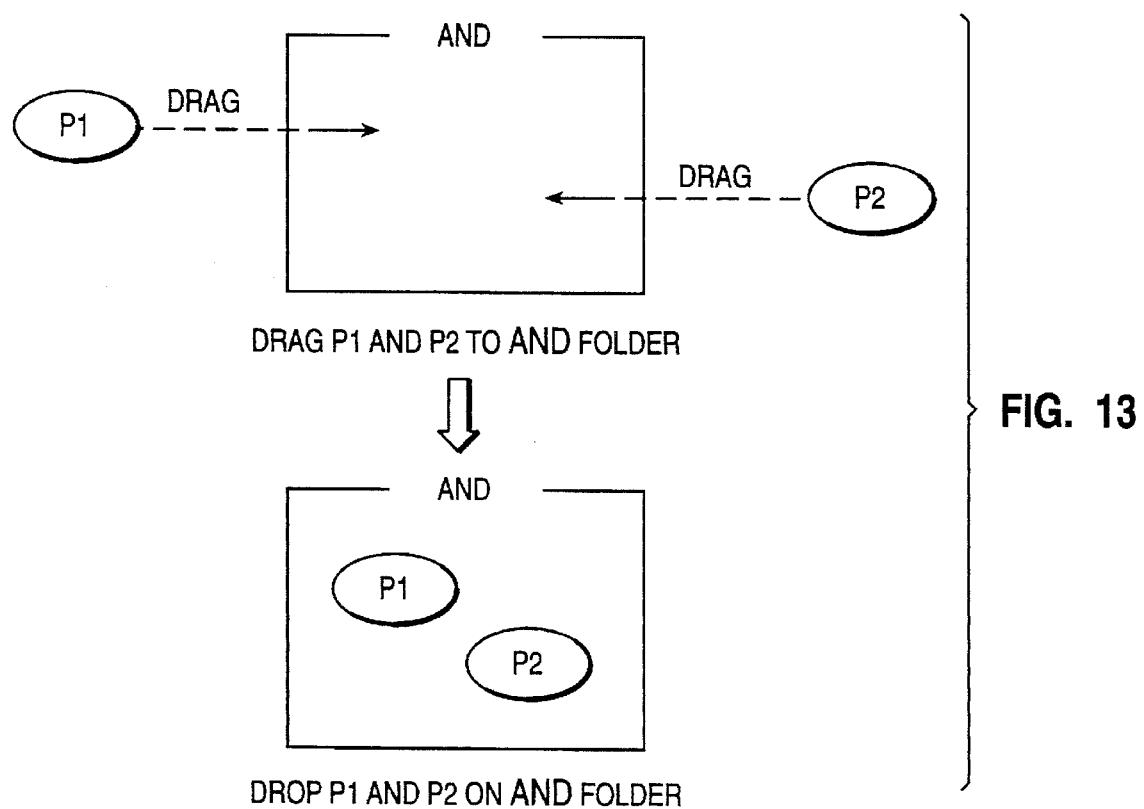
FIG. 13 is a diagram showing basic mouse operations which the user may use on the desktop, and specifically a diagram showing creation of a composite predicate.
Figure 15:
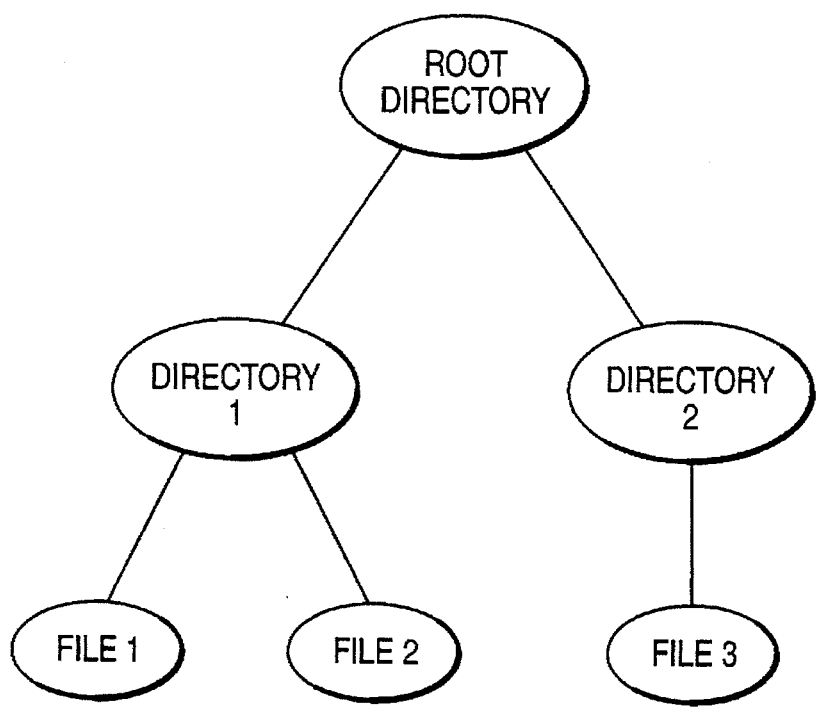
FIG. 15 is a diagram showing the configuration of files hierarchically organized in a file system incorporated in a computer system.
Figure 16:
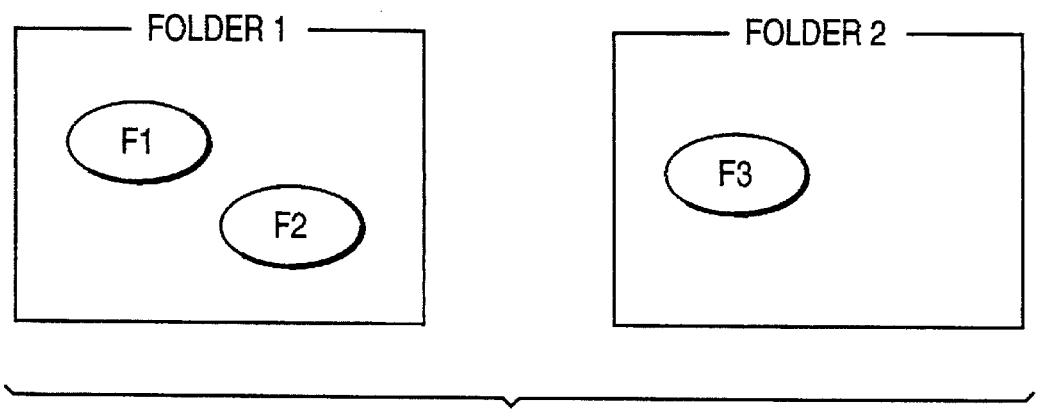
FIG. 16 is a diagram showing an example of hierarchically organized files on the desktop.
Figure 17A:
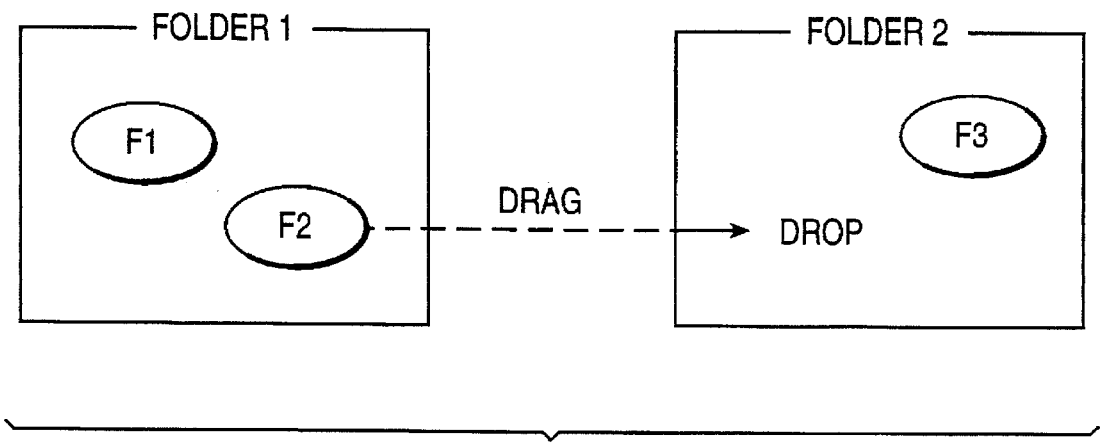
FIGS. 17(a) and 17(b) are diagrams showing an operation for moving a minimized-to-icon file from one directory to another by drag & drop.
Figure 17B:
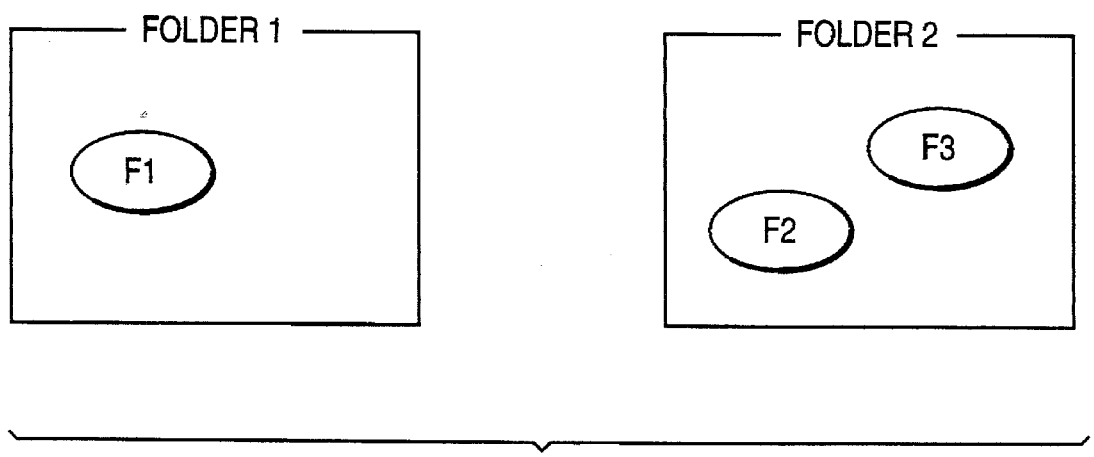
Figure 18:
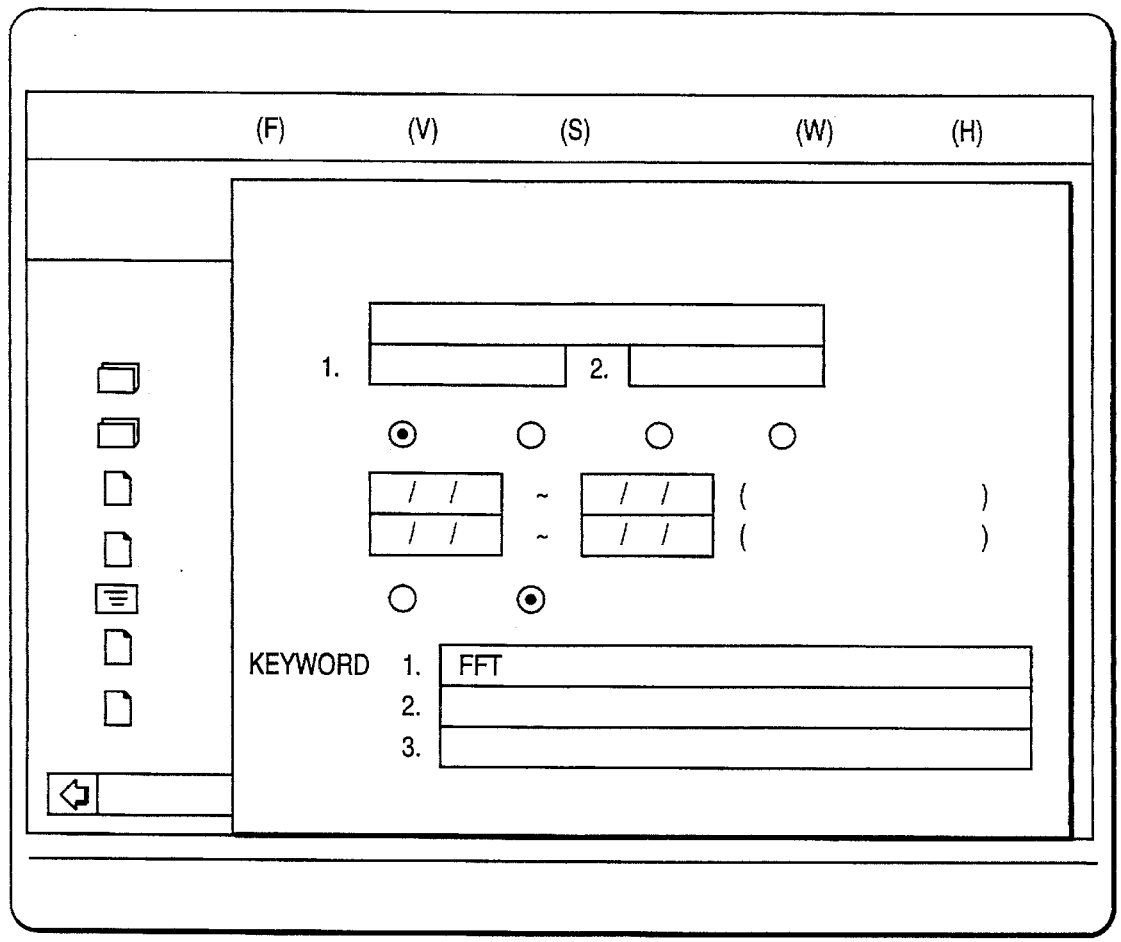
FIG. 18 is a diagram showing a screen display of a document search tool provided by the DOS Office of Office Vision/400.

As shown in FIG. 13, first, a folder corresponding to a desired logical expression (in the figure, AND) is created by a menu command on the desktop (not shown). Then, only icons desired for use in building the logical expression are selected from those outside the folder (in the figure, $P_1$ and $P_2$), and dragged and dropped in the folder. The display on the desktop changes accordingly.

C-4. Creation of composite predicate (part 2)

Icons desired to be incorporated in a logical expression are selected (by clicking) from one or more icons on the desktop. Then, items appropriate for desired logical operators are selected from menu commands (not shown). In FIG. 14, icons $P_3$ and $P_4$ are selected from icons $P_1$, $P_2$, $P_3$, $P_4$, $P_5$, and $P_6$, and built into a logical relationship by an AND folder.

D. Predicate Manipulation System

The application program (18) is a collection of programs executed by the CPU (11), as described above. The application program includes application programs which access the database system (12) and process data stored therein such as data search, data compression, and data conversion. Moreover, the data search program includes as one component the Predicate Manipulation System (20) used for implementing the present invention.

Figure 2:
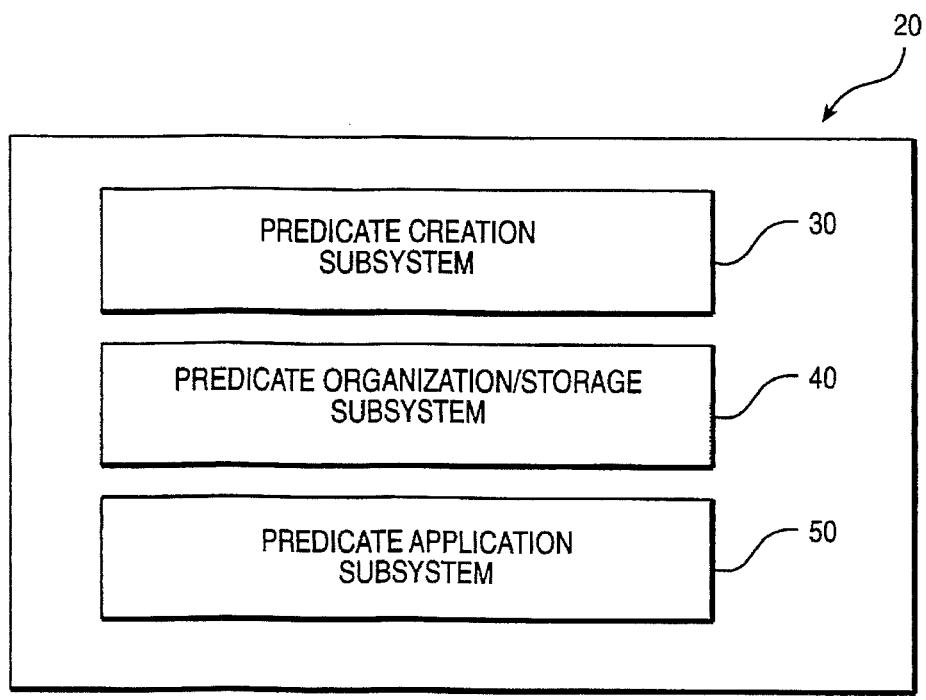
FIG. 2 a schematic diagram of the configuration of a Predicate Manipulation System related to an embodiment of the present invention.

FIG. 2 shows an outline of the configuration of Predicate Manipulating System (20). The Predicate Manipulation System (20) is further divided into three, that is, a predicate creation subsystem (30) for supporting activities of the user to create a predicate on the desktop, a predicate organization/storage subsystem (40) for organizing and storing a final predicate for the desired search by organizing individual created primitive and composite predicates, and a predicate application subsystem (50) for applying organized composite predicates to the file system.

D-1. Predicate data structure

FIG. 3 shows a data structure used by this embodiment (particularly, the Predicate Manipulation System (20)), FIG. 3(a) showing the structure of the data block for the primitive predicate (60), and FIG. 3(b) showing the structure of the data block for the composite predicate (70).

The data block for the primitive predicate (60) includes a type field (61), a pointer (62) to a next sibling, a status field (63), a data type field (64), and an attribute field (65). Furthermore, the data block for the composite predicate (70) includes a type field (71), a pointer (72) to a next sibling, a status field (73), and a pointer (74) to the first child data block.

Fields at the first to third levels of both data blocks (60) and (70) have a common structure. Type fields (61) and (71) are used to determine whether a predicate is primitive or composite. If it is primitive, PRIMITIVE or data equivalent to it is written. If it is composite, one logical operator among AND, OR, or NOT is written. Pointers (62) and (72) to next siblings point to a storage location of a data block associated with each other as the same level in the organized hierarchical structure (that is, a next sibling). Status fields (63) and (73) indicate the displayed state of the predicate on the desktop. OPEN being written if the object is open, while CLOSED being written if it is minimized to an icon.

The data type field (64) identifies the type of data to be applied with a predicate. Types which may be used include a file, a register of names, and multimedia data such as images. The attribute field (65) is the search item which a predicate actually identifies. Attributes which can be input depend somewhat on the type specified in the data type field (64). For example, if the data type is a file, attributes which can be selected includes the creation date, its size, and the owner of the file. If the data type is a register of names, attributes which can be selected includes a person's name, the birth date, a telephone number, and hobby. The pointer to the first child data block (74) at the bottom of the data block for the composite predicate (70) points to the storage location of a data block coupled to one immediately below it in the organized hierarchical structure. Why only a data block relating to a composite predicate has the pointer to a child data block (74) may be understood by taking into consideration the fact that a primitive predicate becomes only the end (or leaf) of the hierarchical structure, while a composite predicate cannot become the end (or leaf) of the hierarchical structure (it has another composite predicate or a primitive predicate in its lower level).

FIG. 4 illustrates an organized final predicate.

FIG. 4(a) expresses it as a form of ordinary logical expression. That is, it contains four primitive predicates P1, P2, P3, and P4, and takes a logical product between the logical sum of P1, and P2, and that of P3 and P4.

FIG. 4(b) represents the predicate shown in FIG. 4(a) in a tree structure. That is, an AND node corresponding to the logical product becomes the top level, an OR node corresponding to each term of the AND operation is coupled immediately below the AND node, and P1 and P2, or P3 and P4 corresponding to each term of each OR operation are coupled immediately below respective OR nodes.

FIG. 4(c) is an example of the predicate shown in FIG. 4(a) which is displayed on the desktop. Because the status of AND, which is a logical product of two corresponding to this predicate, is OPEN, an object on the desktop corresponding to this predicate is displayed as an AND folder, in the region of which each object corresponding to OR, which is a node immediately below, is displayed. Because the logical sum OR of P1, and P2 has OPEN as its status, an object corresponding to this predicate is displayed as an OR folder, in the region of which icons corresponding to P1, and P2 are displayed. Moreover, because the logical sum OR of P3 and P4 has CLOSED as its status, it is minimized to an icon. It is a matter of course that the status of a minimized-to-icon composite predicate can be changed to OPEN by double-clicking on the icon to display it as a folder, or the status of a composite predicate displayed as an folder can be changed to CLOSED to make it an icon. Furthermore, although a primitive predicate is displayed as an icon in a folder (that is, its status is CLOSED), if it is changed to OPEN by clicking, it is displayed as a panel containing an attribute field, described later.

FIG. 4(d) represents the predicate shown in FIG. 4(a) in a form of layered data blocks. The top data block (81) corresponds to AND, and has "nil" in its next sibling pointer because it has no next sibling in a layer on the same level. Its child pointer points to a data block OR (82) immediately below. The next sibling pointer of the data block (82) points to a data block OR (83) which is another term of an AND operation, whereby both data blocks (82) and (83) are indicated to be on the same level in the hierarchy. The child pointer of the data block (82) points to a data block (84) relating to the primitive predicate P1, as a data block immediately below. The next sibling pointer of the data block (84) points to a data block (85) relating to P2, which is another term of an OR operation. Moreover, because there is no term of an OR operation relating to a data block (82) other than P1, and P2, the next sibling pointer of the data block (85) points to "nil." Also, the data block (83) forms a similar connection relationship with data blocks (86) and (87) derived from it. The status field of each data block substitutes for a value corresponding to FIG. 4(c). That is, a data block on the same level in the hierarchy can be registered as new by connection with the next sibling pointer. A data block on a lower level can be newly registered by connecting a child pointer.

With the above description, it can be fully anticipated that even a predicate created by logical operators in a complex manner can be represented by the data structure shown in FIG. 3.

The predicate organization/storage subsystem (40) stores and controls predicates in the data structure (layered data block) shown in FIG. 4(d), described later.

D-2. Creation of predicate

Creating a predicate means to create individual primitive predicates and composite predicates for a predicate for searching a database, and is handled by the predicate creation subsystem (30). The predicate creation subsystem (30) is further divided into a primitive predicate creation/modification section (31) and a composite predicate creation/modification section (32).

The primitive predicate creation/modification section (31) creates one data block related to a primitive predicate in response to the user selecting the CREATE PRIMITIVE command in the menu by a mouse operation, and incorporates it at a predetermined location in a hierarchical predicate stored in the predicate organization/storage subsystem. The composite predicate creation/modification section (32) creates one data block related to a composite predicate in response to the user selecting the CREATE FOLDER command in the menu by a mouse operation, and incorporates it at a predetermined level in the predicate stored in the predicate organization/storage subsystem (40).

FIG. 5 is a conceptual diagram showing the cooperative operation between the Predicate Manipulation System and the Window Manager in creating a predicate. The procedure for creating a predicate is described based on this figure.

D-2-1. Creation of primitive predicate

First, the operation creating a primitive predicate is considered.

The user selects CREATE PRIMITIVE from the menu displayed on the desktop (by clicking). A menu display/selection section (91) notifies the primitive predicate creation/modification section (31) of the this selection operation. In response to this, the primitive predicate creation/modification section (31) prepares one data block for a primitive predicate (FIG. 3(a)), and prompts the panel display/modification section (95) to display the panel on the desktop. The user inputs attributes (conditions to search for a keyword) in the attribute field in the panel. Then, the attributes input on the screen are written to an applicable field in the data block through the primitive predicate creation/modification section (31). The completed data block is temporarily held as a unit in the primitive predicate creation/modification section (31), and incorporated in another layered data block in the predicate organization/storage subsystem (40) in subsequent operation, described later.

D-2-2. Creation of composite predicate

The operation for creating a composite predicate is considered next.

A composite predicate is created two ways: (I) drag & drop of icons with the mouse and (II) using the WRAP command in the menu.

(I) Creation of composite predicate by icon drag & drop

It is a prerequisite that, on the desktop, are folders representing desired composite predicates such as AND, OR, or NOT. (In the case where a new folder is created because a desired composite predicate is not on the desktop, it is created by selecting CREATE FOLDER in the menu, which is reported to the composite predicate creation/modification section (32), which prepares one corresponding data block (FIG. 3(b)) and causes a folder display section (93) to display the folder.)

The user moves an icon to be contained in the folder (that is, an icon representing a predicate to be made a term of a logical operation expression related to the folder) inside the folder by drag & drop. However, it may be obvious from the preceding description that the icon to be moved may be an icon of a primitive predicate or another composite predicate (or, folder) minimized to an icon. The drag & drop notification section (92) detects from a coordinate indication signal (not shown) from the mouse which icon has been moved from which folder to which folder, causes the folder display section (93) and the icon display section (94) to update the display on the desktop, and notifies the composite predicate creation/modification section (93).

In response to this notification, the composite predicate creation/modification section (93) appropriately connects pointers between each data block to form a new parent-child relationship between the destination folder and the icon moved to it.

(II) Creation of composite predicate by WRAP

The user selects one or more icons on the desktop to make terms of a logical operation expression such as AND, OR, or NOT (however, the icon may correspond to either a primitive predicate or another composite predicate). The selection is made by collecting icons in a predetermined range with clicking or drag & drop.

Then, the user selects WRAP in the menu, and specifies the type of logical operation. WRAP creates a new folder surrounding icons. The selection of this command is reported to the composite predicate creation/modification section (32), and prompts the folder display section (93) to display the folder. Then, it prepares one data block corresponding to this folder (FIG. 3(b)), and establishes the desired logical operation expression by connecting data blocks related to the surrounded icons with pointers.

Data blocks related to the folder created by either method (I) or (II) are temporarily held in the composite predicate creation/modification section (32), and incorporated in the layered data block in the predicate organization/storage subsystem (40), described later.

D-3. Organization and storage of predicate

Organization and storage of predicates means to hierarchically organize and store primitive and composite predicates individually created in D-2, or to reorganize stored layered predicates.

FIG. 6 is a conceptual diagram showing the cooperative operation between the Predicate Manipulation System and the Window Manager in further modifying or correcting the predicate. Modification and correction herein referred to include (I) modifying an attribute value specified by a primitive predicate and (II) modifying the parent-child relationship between data blocks.

(I) Modifying an attribute value specified by a primitive predicate

First, a minimized-to-icon primitive predicate is made OPEN by double-clicking or the like and displayed on a panel on the desktop. Then, search items in the attribute field on the panel are modified by input through the keyboard, and minimized again to an icon. In response to this, the primitive predicate creation/modification section (31) prompts the predicate organization/storage subsystem (40) to modify the attribute value corresponding to the primitive predicate.

(II) Modifying the parent-child relationship between data blocks

Modification of the parent-child relationship between data blocks means to cancel or newly organize a parent-child in the hierarchy by moving a data block below a certain data block to a level below another data block, or by deleting a folder.

A parent-child relationship is canceled one of two ways: dragging or UNWRAP.

Dragging removes the desired icon from the folder and is reported to the composite predicate creation/modification section (32) by the drag & drop notification section (92). In response to this, the composite predicate creation/modification section (32) prompts the predicate organization/storage subsystem (40) to detach the data block corresponding to the icon from the child pointer of the data block corresponding to the folder.

UNWRAP is selected in the menu, and this is notified to the composite predicate creation/modification section (32). In response to this, the composite predicate creation/modification section (32) prompts the folder display section (93) to remove display of the folder for which UNWRAP is instructed. In addition, the composite predicate creation/modification section (32) prompts the predicate organization/storage subsystem (40) to delete the data block corresponding to this folder, and to shortcut the data block immediately below it and the data block immediately above it by a pointer.

Furthermore, the parent-child relationship is created by dropping the icon being dragging into a desired folder. The drag & drop notification section (92) notifies the composite predicate creation/modification section (32) of which folder the icon is moved from and which folder is the destination of drag & drop. Dragging outside the folder is as described above. Then, when the icon is dropped into the folder, the composite predicate creation/modification section (32) establishes a new parent-child relationship by connecting the child pointer of the data block corresponding to the folder to the data block of the icon (or, adding it to the next sibling of the data block related to another icon in the folder).

Thus, the finally obtained predicate is stored in the predicate organization/storage subsystem (40), but may be stored in a disk, diskette, memory card, ROM, or another memory device, or copied to RAM for computer execution.

D-4. Application of predicate

Application of a predicate searches for an object satisfying the predicate in a database by using the predicate stored in the predicate organization/storage subsystem (40), and is handled by the predicate application subsystem (50). The predicate application subsystem (50) is further divided into a primitive predicate application section (51), a composite predicate application section (52), and a folder manipulation section (53). The primitive predicate application section (51) is arranged to reference data blocks relating to a desired primitive predicate from the predicate organization/storage subsystem (40), to apply them to an object to be searched for, and output either "true" or "false" whether it satisfies the predicate. Also, the composite predicate application section (52) is arranged to reference data blocks related to a desired composite predicate from the predicate organization/storage subsystem (40), if the data block immediately below is a primitive predicate, to have the primitive predicate application section (51) apply it, if the data block immediately below is further a composite predicate, to recursively process that lower predicate, and to output either "true" or "false" by logically operating on all outputs of lower predicates. The folder manipulation section (53) is arranged to sequentially fetch objects from the folder to which the predicate is applied, and to pass them to the respective predicate application sections (51) and (52).

The application of a predicate is instructed one of two ways: dropping an icon corresponding to the predicate on an object (folder or icon) corresponding to the database (subject of search) on the desktop (D-4-1, described later) or dropping an icon corresponding to the database on an object corresponding to the predicate (D-4-2, described later).

D-4-1. Dropping of predicate icon on object to be searched

In this case, the predicate is applied to an object (folder) subject to search specified by drop, and only objects (folders) satisfying the predicate are obtained as output. FIG. 7 is a conceptual diagram showing the cooperative operation between the Predicate Manipulation System and the Window Manager in performing a search in this case. The description is based on the figure.

First, the user drags and drops a predicate icon on an object (folder) subject to a search to which application is intended. Then, the drag & drop notification section (92) reports which predicate is dropped on which search subject of the folder manipulation section (53). Thus, the object upon which the predicate icon is dropped becomes the search range. The folder manipulation section (53) prompts the folder display section (93) to change displays of the background color for the dropped folder or the like.

Then, the folder manipulation section (53) fetches individual objects (files) from the object (folder) subject to search, and passes them to the predicate application sections (51) and (52). If the predicate is primitive, it is passed to the primitive predicate application section (51), which in turn returns a result of true or false. However, if the predicate is composite, it is passed to the composite predicate application section (52), and lower predicates are recursively processed. Then, objects with the result of true are temporarily saved as the search results. Search results are also reported to the folder display section (93) so that the individual objects as the search result are changed for their display in the folder (such as highlighting).

FIG. 8 is conceptual diagram showing what happens when a predicate icon is dropped on an object to be searched. An object specified as a search range usually takes the form of a folder, which contains other objects therebelow. Then, the object to be contained may be a minimum and indivisible object such as a file (1', 2', 3', 4', 5', and 6' in FIG. 8), or a folder having further lower nests (FOLDER 1, and FOLDER 2 in FIG. 8). When a predicate is applied to a folder subject to search, modes are considered where only files immediately below the folder subject to search are searched (the predicate is applied to only 1', 2', and 6' in FIG. 8), and where, if the lower object is a folder, the lower object is also recursively searched (the predicate is applied to all of 1', 2', 3', 4', 5', and 6' in FIG. 8).

D-4-2. Dropping of icon to be searched on predicate icon

Figure 9:
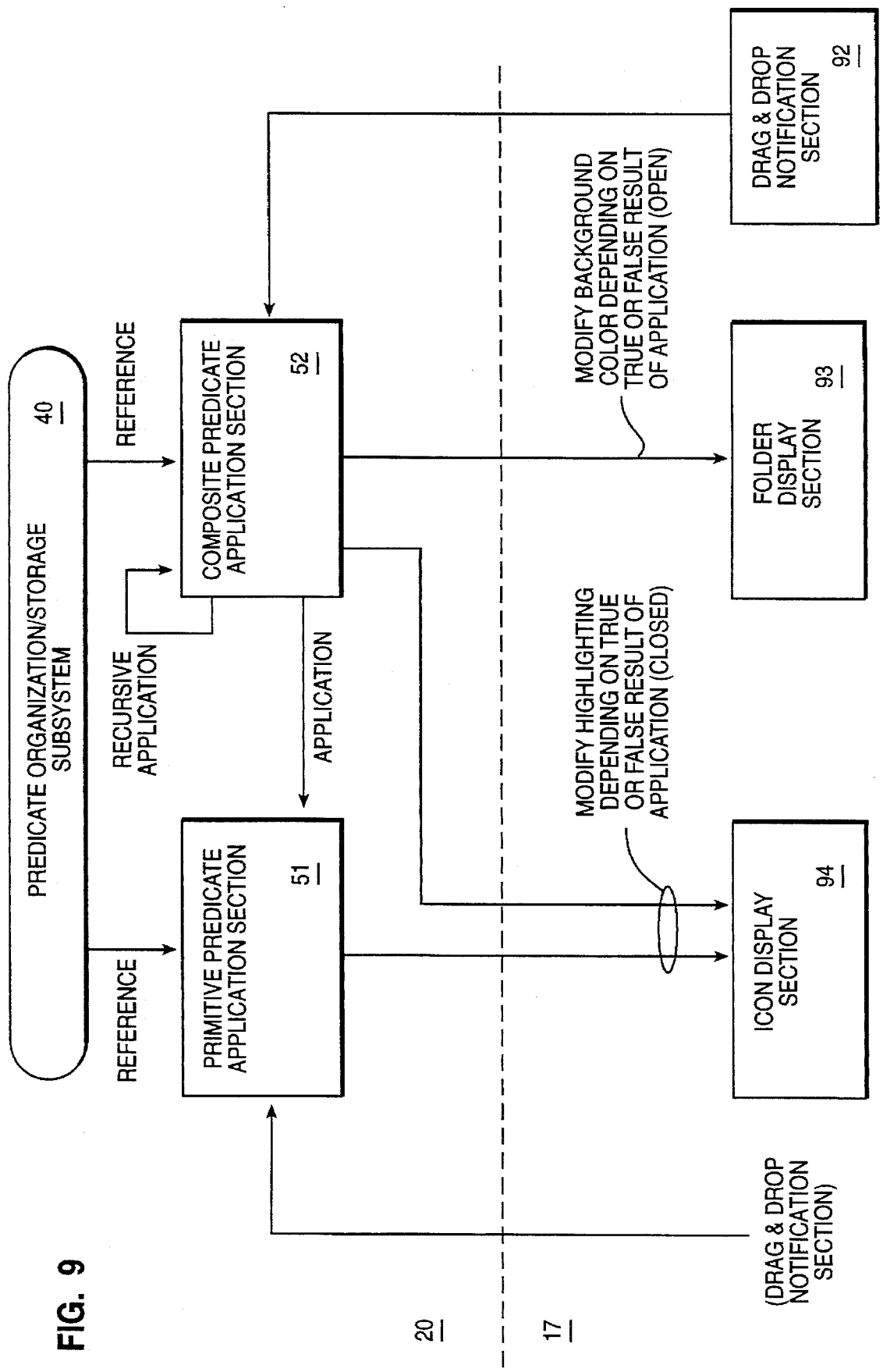
FIG. 9 is a conceptual diagram showing the cooperative operation between the Predicate Manipulation System and the Window Manager in performing a search by the crated predicate.

In this case, the object is applied to a predicate specified by dropping the object, and whether or not the subject object satisfies the predicate (that is, true or false) is obtained as output. The object may be a collective database (that is, a folder), or a minimum and indivisible object (that is, a single file). If the object is a folder, it is attained in substantially the same operation D-4-1. Therefore, description is made only for a case where the object is minimum and indivisible (for the convenience, hereinafter the minimum and indivisible object subject to search being named and distinguished as an "object of application"). FIG. 9 is a conceptual diagram showing the cooperative operation between the Predicate Manipulation System and the Window Manager in performing a search in this case. The description is based on the figure.

First, the user drags and drops an object of application which becomes the search range on a predicate icon to which application is intended. Then, the drag & drop notification section (92) notifies the predicate application sections (51) and (52) of the fact.

If the predicate icon specified by dropping is composite, the composite predicate application section (52) further recursively reads a data block therebelow, and, when a primitive predicate is encountered, has the primitive predicate application section (51) apply it. Then, the primitive predicate application section (51) applies the primitive predicate to the object of to search, and returns a result of true or false to the composite predicate application section (52). Then the composite predicate application section (52) performs the logical operation specified by the type field of the data block on all results of lower predicates recursively processed, and outputs its result. Then, if the predicate object is displayed as a folder on the desktop (that is, OPENed), it prompts the folder display section (93) to change the display such as the background color depending on the result of true or false. In addition, if the predicate object is displayed as an icon (that is, CLOSEd), it prompts the icon display section (94) to change the display such as highlighting of the icon of to application.

Further, if the predicate icon specified by dropping is primitive, it applies a primitive predicate to the object of search and prompts the icon display section (94) to change the display such as highlighting of the predicate icon depending on the result of true or false.

Figure 10:
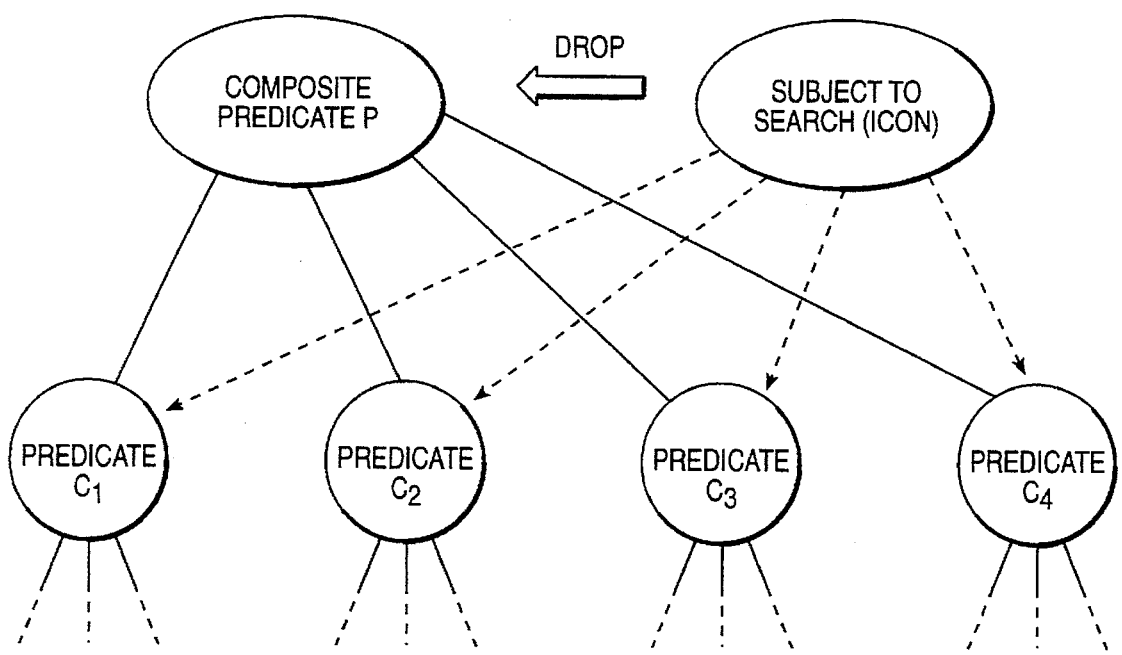
FIG. 10 is a conceptual diagram showing what happens when the object of application is dropped on the predicate icon.

FIG. 10 is a conceptual diagram showing the operation when the object of application is dropped on the predicate icon. In this figure, individual predicates $C_1$, $C_2$, $C_3$, and $C_4$ are nested for a composite predicate P as terms of a logical operation expression related to P. When the object of application is applied to the composite predicate P, it is recursively applied to $C_1$, $C_2$, $C_3$, and $C_4$ (it is further recursively applied to a predicate having a nest such as $C_1$, and $C_3$). Then, each term $C_1$... returns to the composite predicate P a value of either true or false as the result of application. Then, the composite predicate P performs a logical operation corresponding its type for the result returned from each term. For example, if it is AND, it takes a logical product of the result of each term. That is, if a predicate $C_i$ is "false," P becomes "false," and if all predicates $C_i$ are "true," P also becomes "true." (Similarly, if it is OR or NOT, it takes a logical sum or logical difference.) Thus, as the result of application, the predicate icon is highlighted according to true or false for the predicate. If a folder is displayed by opening this icon, the nested lower predicate icons are highlighted according to true or false for the predicate icon.

Although the present invention is described in detail with reference to a specific embodiment, it is obvious that those skilled in the art may alter or modify the embodiment.

Advantages of the invention

As described above in detail, the present invention enables the user to identify a primitive predicate by inputting search items (that is, file attributes) on the desktop, and to create a logical operation expression for identifying search conditions by displaying a composite predicate representing logical operators as a folder and by dragging and dropping an icon representing the predicate on the folder. In addition, the present invention provides excellent operability because a predicate can be displayed on the desktop on a desired hierarchical level by opening or closing an icon for each composite predicate from an icon to a folder, or a folder to an icon. Then, a predicate can be applied as search conditions by dropping an icon representing the created predicate on a folder representing a database (in this case, the dropped object of display becomes the search range). Further, the predicate can be applied to the database by dropping an icon representing the database on a predicate icon (or folder).

In other words, the present invention can provides a graphical user interface which can create a predicate for searching data only by a mouse on the desktop, and which can apply the predicate to a database system.

We claim:

1. A graphical search interface implemented in a computer system, said computer system having processing means, a display, a keyboard for console input, a pointing device for selecting coordinate values, and storage means for storing and managing one or more objects, said computer system including a Window Manager supporting display of objects on said display, said graphical search interface comprising:

(a) predicate creation means for creating a predicate for searching for desired objects in storage, said predicate being a primitive predicate if it is a single indivisible search item, or a composite predicate if it is comprised of other predicates;

(b) predicate organization/storage means for hierarchically organizing and storing created predicates, said organization/storage means being responsive to said pointing device to hierarchically group said predicates, said organization/storage means storing each primitive predicate as a predicate object hierarchically related to other predicate objects by a predicate relation;

(c) predicate application means for applying stored predicates to one or more objects in storage said predicate application means including:

(1) primitive predicate application means for applying a primitive predicate to the object in said storage, said primitive predicate application means being responsive to said pointing device to select the object in storage; and (2) composite predicate application means for applying a composite predicate to the object in said storage, said primitive predicate application means being responsive to said pointing device to select the object in storage; and (d) display means for displaying a search result selected from said objects in storage and satisfying said predicate.

2. A graphical search interface claimed in claim 1, wherein said predicate creation means further comprises:

(a) a primitive predicate creation means for creating an indivisible primitive predicate containing search items; and (b) a composite predicate creation means for creating a composite predicate creating a logical operation for one or more predicates, said composite predicate creation means being responsive to said pointing device to group one or more said objects into a hierarchically organized logical operation.

3. A graphical search interface claimed in claim 2, wherein said predicate organization/storage means is to organize and store one or more predicates in a form combining one or more logical operations, and prepares a data block corresponding to each predicate created by said primitive predicate creation means and said composite creation means.

4. A graphical search interface claimed in claim 3, wherein said predicate organization/storage means organizes and stores one or more predicates in a form combining one or more logical operations by hierarchically organizing them in such a manner that a second predicate, that is a composite predicate, for forming logical operations between first predicates each of which is a primitive predicate or a composite predicate obtained in previous logical operation on other predicates, is placed on a level immediately above the first predicate.

5. A graphical search interface claimed in claim 4, wherein said predicate application section comprises:

(a) a primitive predicate application means applying a primitive predicate to the object in said storage; and (b) a composite predicate application means for applying a composite predicate to the object in said storage.

6. A graphical search interface claimed in claim 5, wherein said composite predicate application means recursively accesses and calls lower predicates from said predicate organization/storage means, and has said primitive predicate application means perform application when a primitive predicate is called.

7. A graphical search interface claimed in claim 2, wherein said primitive predicate creation means and said composite predicate creation means operate in response to drag & drop notification via the pointing device from said Window Manager.

8. A graphical search interface claimed in claim 1, wherein said primitive predicate application means and said composite predicate application means operate in response to drag & drop notification via the pointing device from said Window Manager.

9. A graphical search interface claimed in claim 1, wherein said predicate creation means sends to said Window Manager a command for displaying each predicate on said display.

* * * * *